Feb. 6, 1934.  A. HUGUENIN  1,945,900

ROTOR WHEEL

Filed Feb. 5, 1932   2 Sheets-Sheet 1

A. Huguenin
INVENTOR

By: Marks & Clark
Attys.

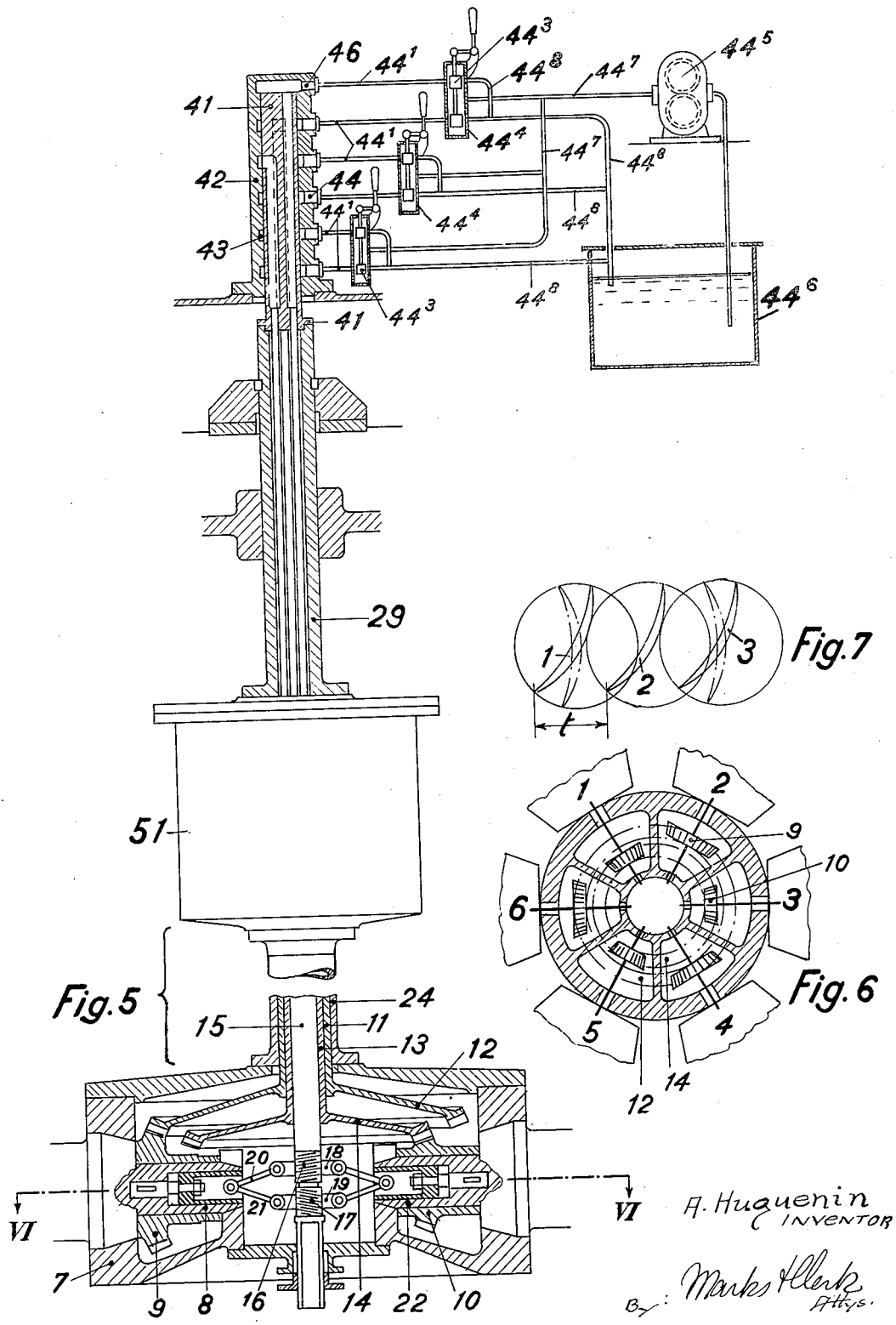

Patented Feb. 6, 1934

1,945,900

UNITED STATES PATENT OFFICE 1,945,900

ROTOR WHEEL

Albert Huguenin, Paris, France

Application February 5, 1932, Serial No. 591,186, and in France February 6, 1931

4 Claims. (Cl. 253—148)

This invention has for object improvements in the arrangement of the shafts of the rotor wheels of rotary reversing machines, and more particularly of those of the type described in the United States Patent No. 1,716,134.

These improvements particularly allow of avoiding the necessity of giving a flared shape to the upper part of the driving shaft for housing the driving mechanism of the solid shaft and of the two hollow shafts which surround it and control respectively the rotation of the even blades and that of the odd blades of the wheel.

The said improvements will be described with reference to the accompanying drawings, given by way of example, and in which:

Fig. 5 shows in a somewhat smaller scale the way in which the device according to Figs. 1 to 4 cooperates with the runner of the turbine, provided with movable runner blades.

Fig. 6 is a section in a somewhat smaller scale according to line VI—VI of Fig. 5; different parts having been suppressed for more clearness.

Fig. 7 shows sections through the runner-blades according to the development of a circumference in a turbine to which the device according to the invention has been applied.

Figure 1:
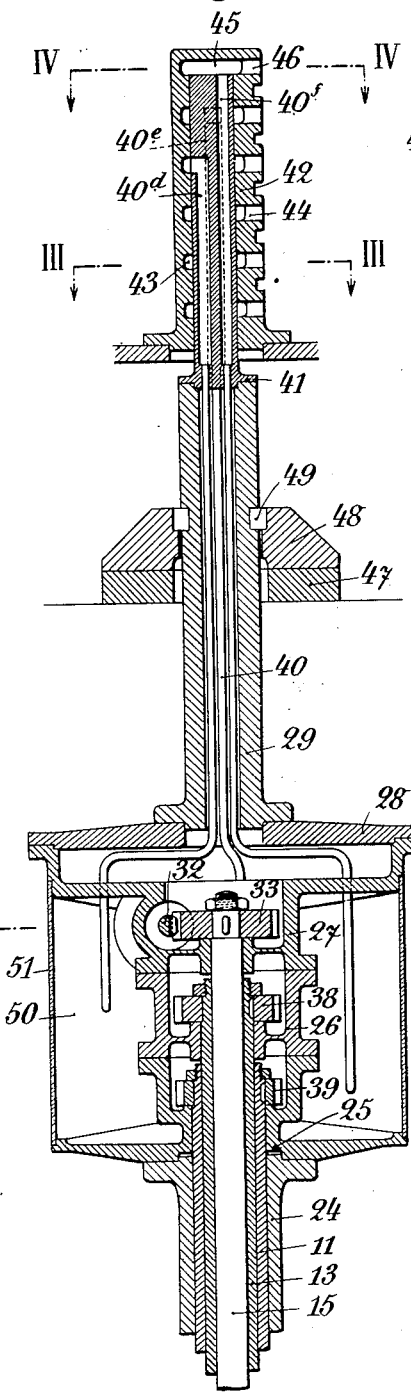
Fig. 1 is a vertical section made through the axis of the shaft.

The runner of the turbine shown in Figs. 5 and 6 is provided with six blades, designated by the numbers 1 to 6. These blades end in frustum-shaped members, located in hub 7. Each of the even blades 2, 4, 6 carries on their frustum-shaped member 8 a bevelled pinion 9 near the periphery of the hub 7 and each of the odd blades 1, 3, 5 carries on their frustum-shaped member 22 a bevelled pinion 10 near the centre of the hub. A hollow shaft 11 carries a gear wheel 12 meshing with the bevelled pinions 9 and a concentric shaft 13 bears a gear wheel 14, meshing with the bevelled pinions 10. A central shaft 15 is provided with left- and right-handed threads 16 and 17, engaged into corresponding nuts 18 and 19, which are connected to the frustum shaped members 8 and 22 by rods 20 and 21; it results therefrom that if the shaft 15 is caused to rotate in a given direction, the blades are released while a rotation of the shaft in the reverse direction renders them rigid with the hub.

Fig. 7 shows the development of a circumferential section of the blades; it is visible that if blades 1 and 3 are turned to the position shown in dash and dotted lines, blade 2 can make a complete revolution.

24 designates the hollow driving shaft arranged underneath the driving device.

On this driving shaft is secured by bolts the casing 25 of the first hydraulic servo-motor controlling the rotation of the hollow shaft 11, and to this casing is attached, by flanges, the casing 26 of the second hydraulic servo-motor controlling the rotation of the hollow shaft 13, on which is secured, by flanges, the casing 27 of the third hydraulically controlled servo-motor ensuring the rotation of the solid shaft 15.

A plate 28 is carried by this casing 27 and is secured by bolts on the top of the same; this plate carries the extension 29 of the driving shaft, which extension is also hollow as the portion 24 of the driving shaft which is located underneath the group of servo-motors above mentioned.

Each servo-motor, for instance that controlling the shaft 15 (see Fig. 2) has a double cylinder 30, the pistons 31 of which are rendered rigid together by a rack 32 meshing with the toothed wheel 33 rigidly secured on the shaft 15. Conduits 34 and 35 lead to both bottoms of this cylinder through the respective covers 36 and 37.

The two other servo-motors are similar to the preceding one, and their piston rods respectively engage with a toothed wheel 38, rigidly secured on the hollow shaft 13, and with a toothed wheel 39, rigidly secured on the hollow shaft 11.

Figure 4:
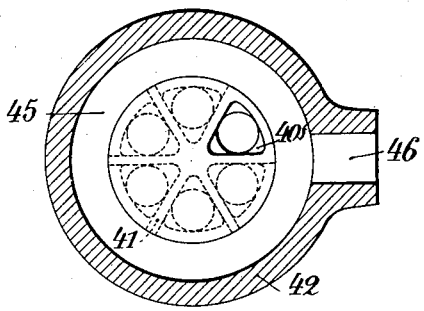
Figs. 2, 3 and 4 are horizontal sections made according to lines II—II, III—III, IV—IV of Fig. 1, respectively.
Figure 3:
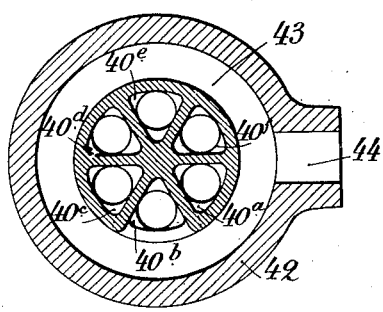

Two driving fluid conduits are therefore provided for each servo-motor, such as 34 and 35 for the servo-motor of the solid shaft 15 (Fig. 2); the six conduits corresponding to the three servo-motors are indicated at 40a, 40b, 40c, 40d, 40e, 40f; these conduits are housed in the bore of the driving shaft 29 and lead to a distributing member or cylindrical slide valve 41 illustrated in section in Figs. 3 and 5 and in plan view in Fig. 4. This distributor 41 is fitted in a fixed casing 42 which has, for each of the ascending conduits 40a, 40b, 40c, 40d, 40e, an annular channel 43 with a corresponding connecting branch 44, as illustrated in detail in Fig. 3. The sixth conduit 40f leads into a circular chamber 45, at the top of the distributor, and carries a connecting branch 46, as illustrated in Fig. 4.

Conduits 44[1] for the inlet and outlet of a pressure medium are respectively connected to the branches 44 and 46. The inlet and outlet of the pressure medium in conduits 44[1] are controlled by hand operated valves 44[3] located in cylinders 44[4]; each of said cylinders is connected on the one hand to a common source of pressure medium (pump) 44⁵ by conduits 44⁷, and on the other hand to a collecting basin 44⁶ for the evacuated medium by conduits 44⁸. It is possible to put in or out of action the different above described servo-motors according to the needs by means of the control valves 44³.

The thrust bearing, preferably secured to the portion 29 of the driving shaft, is diagrammatically illustrated by its upper bearing disc 47 with a stress-transmitting ring 48 held on the shaft by a ring made in two parts 49.

Figure 2:
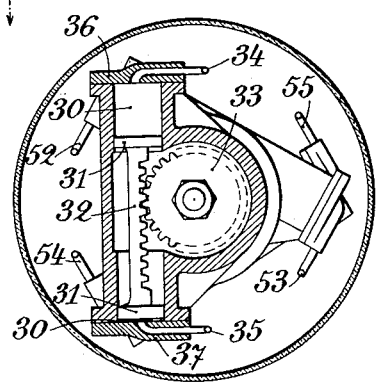

This device allows an easy assemblage, as the upper part of the driving shaft 29, together with the slide valve 41 and the six conduits diagrammatically shown at 40, can be easily attached by means of the cover 28 to the casing 27 of the third servo-motor, whilst allowing free access to the space 50 comprised between the casings of the said servo-motors and a cylindrical sheet metal casing 51 secured at its lower part to the casing of the servo-motor 25 and, at its upper part, to that of the servo-motor 27; this casing 51 is of course made up of two or more parts forming a smooth rotary surface which can be readily taken to pieces. The junction of the six conduits (used for the supply and return of the hydraulic fluid) to the respective covers of the cylinders of the servo-motors, can be easily effected as indicated in Fig. 2 at 34 and 35 for the third servo-motor, at 52 and 53 for the second one, and at 54 and 55 for the first one; moreover, at each period of rest of the turbine, an inspection of the servo-motors and the repair of the piston-ring joints can be effected in the simplest manner.

It is to be understood that the drawings illustrate only one form of construction, the details of which may be varied whilst maintaining the principle which consists in constituting a portion of the driving shaft by means of the casings of the hydraulic driving servo-motors.

I claim:

1. In a rotary machine comprising a hub, two series of pivoting blades the pitch of which is smaller than the width, the respective blades of these two series being alternated and mounted on the hub, means for rendering at will these blades rigid with the hub or for releasing them, a first bored driving shaft element rigid with the hub of the wheel, three casings secured to the end of this first element, a second bored driving shaft element secured to these casings, distributing means at the end of this second element, three concentric shafts in the first element adapted to respectively control the locking and unlocking of the blades and the pivoting movements of both series of blades, a servo-motor in each of the said three casings, connecting means between these three servo-motors and the three shafts controlling the adjustment of the blades, conduits in the second element of the driving shaft, between the servo-motors and the said distributing means.

2. In a rotary machine comprising a hub provided with separate series of blades, means in connection with each of said series of blades for adjusting the inclination of the blades, a hollow driving shaft rigid with the hub, a casing secured to the end of this driving shaft, two hollow shafts concentric to said hollow driving shaft and operatively connected to said means for adjusting the inclination of the blades, a second casing rigid with said first mentioned casing, a driving shaft extension rigidly connected to said second casing, a servo-motor in each of said casings, said servo-motors operating each a series of said blades through one of the hollow shafts, distributing means for a driving fluid at the end of said driving shaft extension, and conduits between said servo-motors and the said distributing means.

3. In a rotary machine comprising a hub provided with separate series of blades, means in connection with each of said series of blades for adjusting the inclination of the blades, a hollow driving shaft rigid with the hub, a casing secured to the end of this driving shaft, two hollow shafts concentric to said hollow driving shaft and operatively connected to said means for adjusting the inclination of the blades, a second casing rigid with said first mentioned casing, a driving shaft extension rigid with said second casing, distributing means for a driving fluid at the end of the driving shaft extension, a servo-motor in each of said casings, each of these servo-motors comprising a cylinder which is rigid with the casing enclosing it and has its axis at right angles to that of said driving shaft, a rack in each of said cylinders, two pistons in each cylinder respectively secured to each end of the rack, two conduits in connection with each of said cylinders connecting the said distributing means respectively to each end of the cylinder, and pinions rigidly secured to one end of said two hollow-shafts, each of these pinions meshing with the rack of one of said servo-motors.

4. In a rotary machine comprising a hub provided with separate series of blades, means in connection with each of said series of blades for adjusting the inclination of the blades, a hollow driving shaft rigid with the hub, a casing secured to the end of this driving shaft, two hollow shafts concentric to said hollow driving shaft and operatively connected to said means for adjusting the inclination of the blades, a second casing rigid with said first mentioned casing, a servo-motor in each of said casings, said servo-motors operating each a series of blades through one of said two hollow-shafts a hollow driving shaft extending rigid with said second casing, a cylindrical slide valve at the end of the driving shaft extension, said slide valve being perforated with conduits opening on its surface, respectively at different levels, around this slide valve a cylindrical casing fitted on the same and provided with circular grooves respectively located opposite the orifice of each conduit, driving fluid supply means opening in these grooves, and conduits respectively forming an extension of each of the conduits of the slide-valve and leading to the servo-motors.

ALBERT HUGUENIN.